(12) United States Patent
Nishina et al.

(10) Patent No.: US 7,467,512 B2
(45) Date of Patent: Dec. 23, 2008

(54) EXHAUST GAS PURIFYING APPARATUS AND EXHAUST GAS PURIFYING METHOD OF AN ENGINE

(75) Inventors: Mitsuhiro Nishina, Ageo (JP); Toshikazu Katou, Ageo (JP); Hiroyuki Kurita, Ageo (JP)

(73) Assignee: Nissan Diesel Motor Co., Ltd., Ageo-shi (JP)

( * ) Notice: Subject to any disclaimer, the term of this patent is extended or adjusted under 35 U.S.C. 154(b) by 17 days.

(21) Appl. No.: 10/577,222

(22) PCT Filed: Sep. 17, 2004

(86) PCT No.: PCT/JP2004/013607

§ 371 (c)(1),
(2), (4) Date: Nov. 28, 2006

(87) PCT Pub. No.: WO2005/040570

PCT Pub. Date: May 6, 2005

(65) Prior Publication Data

US 2007/0163240 A1    Jul. 19, 2007

(30) Foreign Application Priority Data

Oct. 28, 2003    (JP) ............................. 2003-366737

(51) Int. Cl.
*F01N 3/00*    (2006.01)
(52) U.S. Cl. ............................. 60/286; 60/274; 60/297; 60/301; 60/303

(58) Field of Classification Search ............... 60/274, 60/276, 286, 295, 297, 301, 303
See application file for complete search history.

(56) References Cited

U.S. PATENT DOCUMENTS 6,063,350 A * 5/2000 Tarabulski et al. ....... 423/239.1
6,119,448 A * 9/2000 Emmerling et al. .......... 60/274

(Continued)

FOREIGN PATENT DOCUMENTS

DE        10156714        6/2002

(Continued)

OTHER PUBLICATIONS

International Preliminary Report and Written Opinion, dated Jun. 20, 2006; and an English-language Translation of the International Preliminary Report and Written Opinion.

*Primary Examiner*—Binh Q. Tran
(74) *Attorney, Agent, or Firm*—McDermott Will & Emery LLP

(57) ABSTRACT

In an SCR apparatus mounted on a vehicle, the concentration of a reducing agent or a precursor thereof contained in an aqueous solution of the reducing agent or the precursor is accurately detected. In sensing the concentration, whether or not the urea water stored in a storage tank is in a stationary state is determined. Only it is in a stationary state, the concentration is detected. The determination of whether or not it is in a stationary state or not is preferably determined by determining whether the vehicle is stopped (S207) and that the period of time TIM that has elapsed after the stoppage has reached a predetermined stationary time TIM1 (S211). The deceleration DCL of the vehicle before stoppage thereof is detected, and the stationary time TIM1 is altered in accordance with the deceleration DCL (S206).

17 Claims, 9 Drawing Sheets

U.S. PATENT DOCUMENTS

| | | |
|---|---|---|
| 6,519,935 B2 * | 2/2003 | Weigl .................. 60/286 |
| 7,017,335 B2 * | 3/2006 | Huber et al. ............. 60/286 |
| 7,065,958 B2 * | 6/2006 | Funk et al. ............. 60/286 |
| 7,181,337 B2 * | 2/2007 | Kosaka ................. 701/110 |
| 2004/0045284 A1 | 3/2004 | Ripper et al. |
| 2007/0079599 A1 | 4/2007 | Osaku et al. |
| 2007/0204677 A1 | 9/2007 | Nishina et al. |
| 2007/0209428 A1 | 9/2007 | Nishina et al. |

FOREIGN PATENT DOCUMENTS

| | | |
|---|---|---|
| JP | 04-282433 | 10/1992 |
| JP | 05-222923 | 8/1993 |
| JP | 09-096212 | 4/1997 |
| JP | 11-270329 | 10/1999 |
| JP | 2000-027627 | 1/2000 |
| JP | 2001-020724 | 1/2001 |
| JP | 2002-508466 | 3/2002 |
| JP | 2002-155732 | 5/2002 |
| JP | 2002-513109 | 5/2002 |
| JP | 2002-527660 | 8/2002 |
| JP | 2002-370016 | 12/2002 |
| JP | 2003-269145 | 9/2003 |
| JP | 2003-328744 | 11/2003 |
| JP | 2004-510151 | 4/2004 |
| JP | 2004-517336 | 6/2004 |
| JP | 2004-194028 | 7/2004 |
| JP | 2005-030888 | 2/2005 |
| JP | 2005-083223 | 3/2005 |
| JP | 2005-127262 | 5/2005 |
| JP | 2005-133541 | 5/2005 |
| JP | 2005-133695 | 5/2005 |
| WO | WO 99/30810 | 6/1999 |
| WO | WO 99/55445 | 11/1999 |
| WO | WO 00/21881 | 4/2000 |
| WO | WO 02/27280 | 4/2002 |
| WO | WO 02/057603 | 7/2002 |
| WO | WO 03/018177 | 3/2003 |
| WO | WO 2005/024194 | 3/2005 |
| WO | WO 2005/040567 | 5/2005 |
| WO | WO 2005/042936 | 5/2005 |

* cited by examiner

EXHAUST GAS PURIFYING APPARATUS AND EXHAUST GAS PURIFYING METHOD OF AN ENGINE

This application is a continuation of PCT/JP2004/013607, filed on Sep. 17, 2004.

BACKGROUND OF THE INVENTION

1. Field of the Invention

The present invention relates to an exhaust gas purifying apparatus and an exhaust gas purifying method for an engine, and more particularly relates to a technique of purging nitrogen oxides exhausted from an engine for an automobile with the use of ammonia as a reducing agent.

2. Description of the Related Art

As an apparatus that purifies air-contaminating substances discharged from an engine, particularly nitrogen oxides in an exhaust gas (hereinafter, referred to as "NOx") by after treatment, the following SCR (Selective Catalytic Reduction) apparatus is known. This SCR apparatus is configured to include an injecting nozzle that is placed in an exhaust passage of an engine and injects an aqueous solution of ammonia or a precursor thereof. The ammonia injected from this injecting nozzle (or ammonia obtained from the precursor thereof) functions as a reducing agent and reacts with NOx in the exhaust gas on a catalyst to reduce and purge the NOx. As an SCR apparatus in which the capability of easy storage of ammonia on a vehicle is taken into consideration, there has been also known the following one. Namely, this SCR apparatus is provided with a tank that stores urea as an ammonia precursor in a state of an aqueous solution and, in the actual operation of an engine, injects the urea water supplied from this tank into the exhaust passage to generate ammonia by hydrolysis of urea using heat of the exhaust gas (Unexamined Patent Publication No. 2000-027627 (JP-A-2000-027627), paragraph number 0013).

Conventionally, an SCR apparatus has been mainly adopted as an exhaust gas purifying apparatus for a stationary engine.

The present inventors have considered a suitable adoption of an SCR apparatus as an exhaust gas purifying apparatus of an engine mounted on a vehicle. In the SCR apparatus, it is important in practice to supply an appropriate amount of urea water to meet the amount of the discharged NOx and to place a urea sensor in the urea water tank to let the actual concentration of urea (hereinafter, when simply referred to as "concentration", it shall be referred to as the concentration of urea) be reflected on the control of the engine and the SCR apparatus, so as to permit the reaction of reduction of NOx to proceed well. Currently, as a urea sensor, those has been developed in which a heater and a temperature measurement resistance body are placed in an insulated state and, by focusing an attention on the heat transmission characteristics of the urea water in accordance with the concentration of urea, the actual concentration of urea is detected on the basis of the resistance value of the temperature measurement resistance body (See JP-A No. 2001-228004).

However, when this temperature-sensitive type urea sensor is to be used on a vehicle, the following problem will be encountered unlike the case of using it in a stationary state.

Firstly, the road surface on which an automobile runs is not completely flat, but has undulations. When an automobile runs on these undulations, the vehicle body vibrates, and this vibration is transmitted also to the urea water tank, so that the urea water vibrates in the tank to be agitated. When one attempts to detect the concentration in an agitated state, a concentration different from the actual one is detected because the heat transmission characteristics of the urea water are different from those of the urea water in a stationary state. As a result, an inappropriate amount of urea water relative to the amount of discharged NOx will be injected.

Secondly, the environment of running and the state of running of an automobile are not always constant. The automobile may run not only on a flat road but also on an ascending road or on a descending road. Also, the gradient of the tilted road on which the automobile is running is not necessarily constant, but may sometimes change. On the other hand, even during the running on a flat road, the automobile may be accelerated or decelerated, and the acceleration or deceleration may be carried out moderately or may be carried out suddenly. When the urea water in the tank is shook by such a change in the environment of running or the like, an erroneous concentration is detected by the difference in the heat transmission characteristics, so that the injecting of the urea water will be an inappropriate one in a similar manner.

As another urea sensor, those focusing an attention on the refractive index of urea water are also known (See JP-A-2001-020724). In the case of adopting this urea sensor, the urea water in the tank should be preferably in a stationary state for stable sensing of the concentration.

SUMMARY OF THE INVENTION

An object of the present invention is, therefore, to make it possible to add an appropriate amount of a reducing agent to an exhaust gas in an SCR apparatus when it is mounted on a vehicle.

The present invention provides an exhaust gas purifying apparatus and an exhaust gas purifying method for an engine. The present invention relates to a technique of purging NOx in an exhaust gas by adding a reducing agent of NOx to the exhaust gas, and can be adequately adopted by a vehicular engine. The reducing agent that is added to the exhaust gas or a precursor thereof is stored in a state of an aqueous solution in a storage tank. The concentration of the reducing agent or the precursor contained in the aqueous solution of the reducing agent or the precursor that is stored in this storage tank is detected, and the detected concentration is reflected on the control of a predetermined object for being controlled, which is related to the purifying of the exhaust gas, preferably on the control of an apparatus for adding the reducing agent. To begin with, determination is made on whether or not the aqueous solution of the reducing agent or the precursor is in a stationary state or not in the storage tank, and controlling of the above-mentioned controlled object is carried out on the basis of the concentration that is detected at the stationary time when determination of the stationary state of the reducing agent or the precursor is made.

In the present invention, the concentration of the reducing agent or the precursor is detected only when the aqueous solution of the reducing agent or the precursor is in a stationary state in the storage tank (including a substantially stationary state that is close to this), for example, when the vehicle is stopped and also a predetermined period of time has elapsed since stopping. For this reason, the concentration is detected excluding the time when the aqueous solution of the reducing agent or the like is being shook in the storage tank by the undulations of the road surface or the change in the environment of running or the like, so that a correct and accurate concentration can be detected under a sensing condition that is as exactly set.

Other objects and features of the present invention will be made apparent from the ensuing description with reference to the attached drawings.

The contents of the Japanese Patent Application No. 2003-366737 that forms a basis for claiming priority is incorporated herein as a part of the present application by reference.

DESCRIPTION OF THE PREFERRED EMBODIMENTS

Hereinafter, preferred embodiments of the present invention will be described with reference to the drawings.

Figure 1:
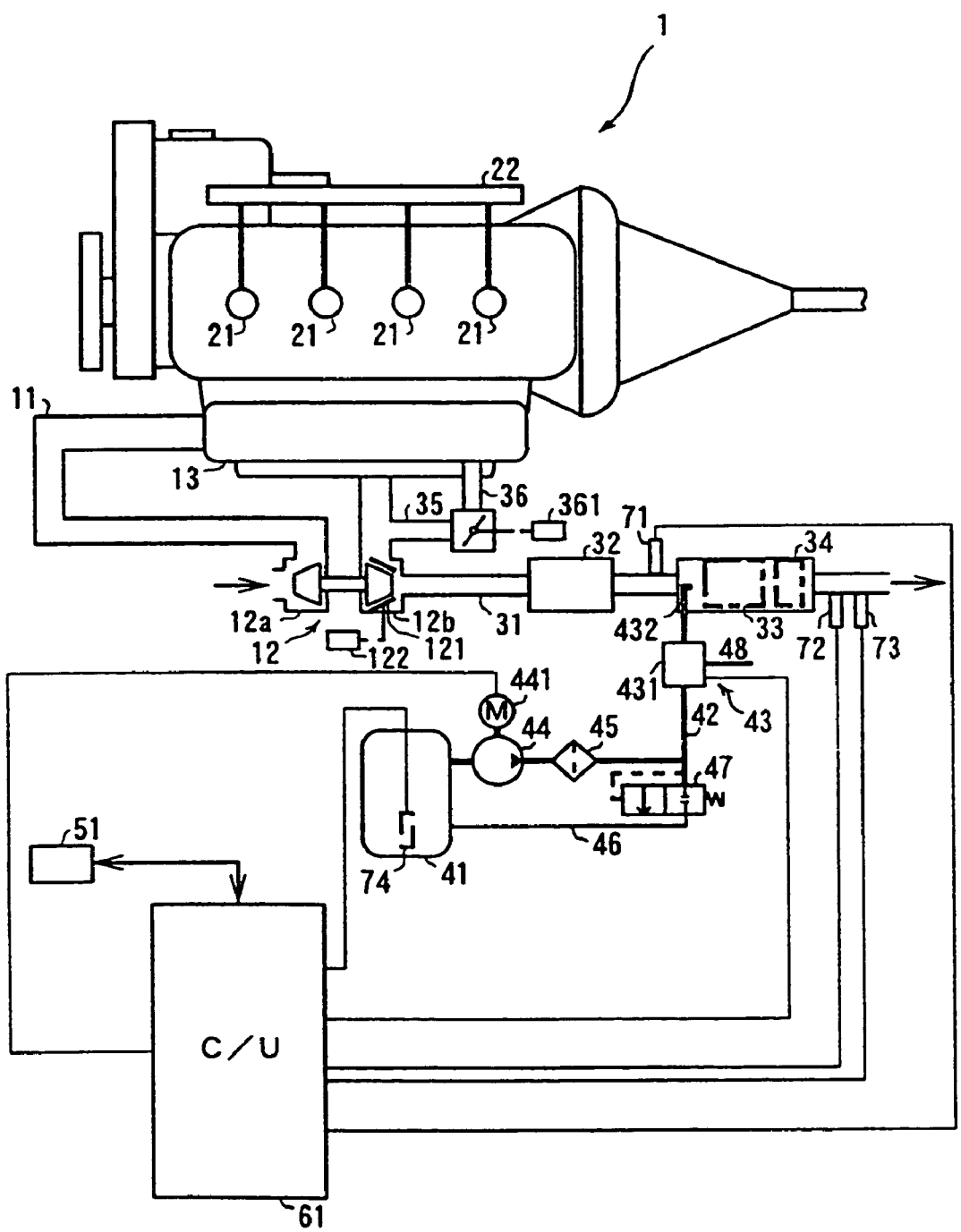
FIG. 1 General configuration of an engine according to one embodiment of the present invention is illustrated.

FIG. 1 shows a configuration of an engine for an automobile (hereinafter, referred to as "engine") according to one embodiment of the present invention. In the present embodiment, a direct injection diesel engine is adopted as an engine 1.

At the introduction part of an intake passage 11, an air purifier not illustrated in the drawings is attached, and the powdery dust in the intake air is removed by the air cleaner. In the intake passage 11, a compressor 12a of a variable nozzle type turbo charger 12 is disposed, and the intake air is compressed and delivered by the compressor 12a. The compressed intake air flows into a surge tank 13, and is distributed into respective cylinders by a manifold portion.

In the engine main body, at the cylinder head, an injector 21 is disposed for each cylinder. The injector 21 operates in accordance with a signal from an engine control unit (hereinafter, referred to as "engine C/U") 51. A fuel that is pumped out by a fuel pump not illustrated in the drawings is supplied to the injector 21 via a common rail 22, and is directly injected into a combustion chamber by the injector 21.

In the exhaust passage 31, a turbine 12b of the turbo charger 12 is disposed downstream of the manifold portion. By the drive of the turbine 12b due to the exhaust gas, the compressor 12a is rotated. A movable vane 121 of the turbine 12b is connected to an actuator 122, and the angle thereof is controlled by the actuator 122. In accordance with the angle of the movable vane 121, the rotating number of the turbine 12b and the compressor 12a is changed.

In the downstream portion of the turbine 12b, an Oxidation catalytic converter 32, a NOx purging catalyst 33, and an ammonia purging catalyst 34 are disposed in this order from the upstream side. The Oxidation catalytic converter 32 oxidizes the hydrocarbon and the carbon monoxide in the exhaust gas, and converts the nitrogen monoxide (hereinafter, referred to as "NO") in the exhaust gas into NOx mainly containing nitrogen dioxide (hereinafter, referred to as "NO2"), thereby performing a function of adjusting the ratio of NO and NO2 contained in the exhaust gas to one that is suitable for the later-described reduction reaction of NOx. The NOx purging catalyst 33 prompts the reduction and purging of NOx. In the present embodiment, for reduction of NOx by this NOx purging catalyst 33, ammonia serving as a reducing agent is added to the exhaust gas at a position upstream of the NOx purging catalyst 33.

In the present embodiment, in consideration of the facility in storing ammonia, urea serving as an ammonia precursor is stored in a state of an aqueous solution. By storing ammonia as urea, safety from diverse aspects can be ensured.

A urea water supply pipe 42 is connected to the storage tank 41 that stores urea water, and an injecting nozzle 43 for injecting urea water is mounted on the tip end of this urea water supply pipe 42. In the urea water supply pipe 42, a feed pump 44 and a filter 45 are interposed in this order from the upstream side. The feed pump 44 is driven by an electric motor 441. The rotating number of the electric motor 441 is controlled by a signal from an SCR control unit (hereinafter, referred to as "SCR-C/U") 61, so as to adjust the discharge amount of the feed pump 44. Also, in the downstream side of the filter 45, a urea water return pipe 46 is connected to the urea water supply pipe 42. In the urea water return pipe 46, a pressure control valve 47 is disposed so that excessive urea water exceeding a prescribed pressure may be returned to the tank 41.

The injecting nozzle 43 is an injecting nozzle of an air assist type, and is configured with a main body 431 and a nozzle section 432. To the main body 431, the urea water supply pipe 42 is connected, and an air supply pipe 48 for supplying air for assisting is connected. The air supply pipe 48 is connected to an air tank not illustrated in the drawings, and air for assisting is supplied from this air tank. The nozzle portion 432 is disposed so as to penetrate through the housing of the NOx purging catalyst 33 and the ammonia catalyst 34 at a position upstream of the NOx purging catalyst 33. The injecting direction of the nozzle portion 432 is set towards the end surface of the NOx purging catalyst 33 in a direction parallel to the flow of the exhaust gas.

When urea water is injected, urea in the injected urea water is hydrolyzed by the exhaust heat, so as to generate ammonia. The generated ammonia acts as a reducing agent of NOx on the NOx purging catalyst 33, so as to reduce the NOx. The ammonia purging catalyst 34 is for purging the slip ammonia that has elapsed by the NOx purging catalyst 33 without contributing to the reduction of NOx. Since ammonia has an irritating smell, it is not preferable to release ammonia to the outside without being purified. The oxidation reaction of NO on the oxidation catalytic converter 32, the hydrolysis reaction of urea, the reduction reaction of NOx on the NOx purging catalyst 33, and the oxidation reaction of slip ammonia on the ammonia purging catalyst 34 are represented by the following formulas (1) to (4). Here, in the present embodiment, the NOx purging catalyst 33 and the ammonia catalyst 34 are incorporated in an integrated housing; however, the respective housings may be configured as separate bodies.

$$NO + \tfrac{1}{2}O_2 \rightarrow NO_2 \tag{1}$$

$$(NH_2)_2CO + H_2O \rightarrow 2NH_3 + CO_2 \tag{2}$$

$$NO + NO_2 + 2NH_3 \rightarrow 2N_2 + 3H_2O \tag{3}$$

$$4NH_3 + 3O_2 \rightarrow 2N_2 + 6H_2O \tag{4}$$

Also, the exhaust passage 31 is fluidly connected to the intake passage 11 by an EGR pipe 35. In the EGR pipe 35, an EGR valve 36 is interposed. The EGR valve 36 is connected to an actuator 361, and the degree of opening thereof is controlled by the actuator 361.

In the exhaust passage 31, between the oxidation catalytic converter 32 and the NOx purging catalyst 33, there is disposed a temperature sensor 71 for sensing the temperature of the exhaust gas before addition of urea water. On downstream side of the ammonia purging catalyst 34, there are disposed a temperature sensor 72 for sensing the temperature of the exhaust gas after the reduction and a NOx sensor 73 for sensing the concentration of NOx contained in the exhaust gas after the reduction. Also, in the storage tank 41, there is disposed a urea sensor 74 for sensing the concentration of urea contained in the urea water.

The sensing signals of the temperature sensors 71, 72, the NOx sensor 73, and the urea sensor 74 are output to the SCR-C/U 61. On the basis of the input signals, the SCR-C/U 61 calculates and sets an optimal amount of injection of the urea water, and outputs a command signal in compliance with the set amount of injection of the urea water to the injecting nozzle 43. Also, the SCR-C/U 61 is connected to be capable of communicating with the engine C/U 51 in both directions, and outputs the detected concentration of urea to the engine C/U 51. On the other hand, on the engine 1 side, there are disposed an ignition switch, a start switch, a crank angle sensor, a vehicle speed sensor, a throttle position sensor, and the like, and the sensing signals of these sensors are delivered as inputs to the engine C/U 51. On the basis of the input signal that comes from the crank angle sensor, the engine C/U 51 calculates the engine rotating number Ne. The engine C/U 51 outputs information necessary for the control of the injecting of urea water, such as an amount of fuel injection, to the SCR-C/U 61.

Figure 2:
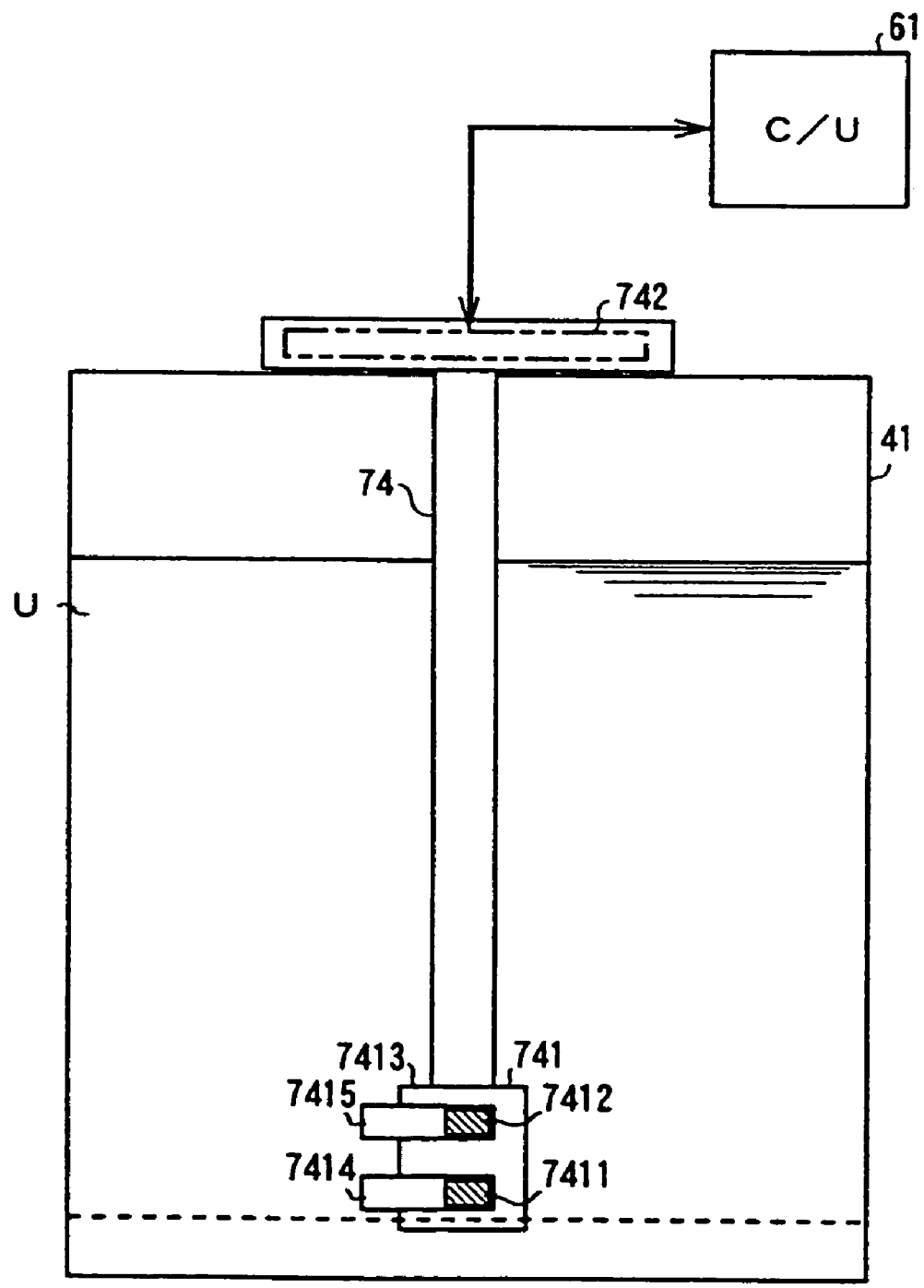
FIG. 2 Configuration of a urea sensor is illustrated.

FIG. 2 shows a configuration of the urea sensor 74.

The urea sensor 74 has a configuration similar to a flow meter described in the above-mentioned JP-A-2001-228004, and detects the concentration of urea on the basis of the electrical characteristic values of two temperature-sensitive bodies.

The flow meter described in the above-mentioned JP-A-2001-228004 (paragraph numbers 0015 to 0017) is configured to include a first sensor element having a heater function and a second sensor element that does not have a heater function. The former first sensor element is configured to include a heater layer and a temperature measurement resistance layer serving as a temperature-sensitive body (hereinafter, referred to as "first temperature measurement resistance layer"), which is formed on the heater layer in an insulated state. The latter second sensor element is configured to include a temperature measurement resistance layer serving as a temperature-sensitive body (hereinafter, referred to as "second temperature measurement resistance layer"); but does not have a heater layer. Each sensor element is incorporated and encased in a housing made of resin, and is connected to one end of a fin plate operating as a heat transmission body.

In the present embodiment, the sensor element section 741 of the urea sensor 74 is configured to include the above-mentioned first and second sensor elements. The sensor element section 741 is disposed in the vicinity of the bottom surface of the storage tank 41, and is used by being immersed in the urea water in sensing the concentration. Also, each fin plate 7414, 7415 penetrates through the housing 7413, and is exposed to the interior of the storage tank 41.

The circuit section 742 is connected to the heater layer and the temperature measurement resistance layer of the first sensor element 7411 and the temperature measurement resistance layer of the second sensor element 7412. By energization of the heater layer, the first temperature measurement resistance layer is heated, while the resistance values $Rn1$, $Rn2$ of the first temperature measurement resistance layer that is heated and the second temperature measurement resistance layer that is not directly heated are detected. The temperature measurement resistance layer has a property such that the electric resistance value changes in proportion to a temperature. On the basis of the detected resistance values $Rn1$, $Rn2$, the circuit section 742 calculates the concentration $Dn$ of urea in the following manner.

Figure 3:
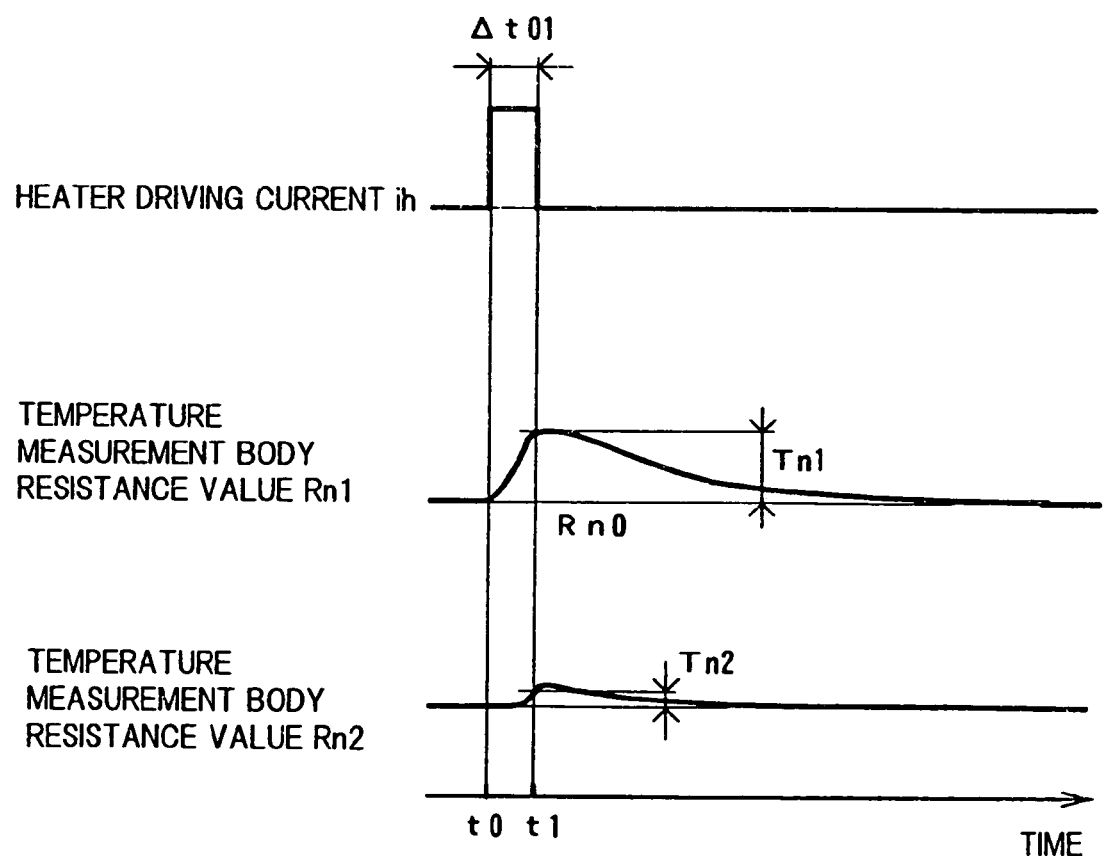
FIG. 3 Principle of sensing the concentration with the urea sensor shown in FIG. 2 is diagrammatically illustrated.

FIG. 3 shows a principle of sensing the concentration (and determination of the remaining amount). In the present embodiment, the determination of the remaining amount is carried out by the SCR-C/U 61 on the basis of the resistance values $Rn1$, $Rn2$ detected by the circuit section 742.

The heating by the heater layer is carried out by passing a heater driving current in through the heater layer for a predetermined period of time $\Delta t\, 01$. The circuit section 742 detects the resistance values $Rn1$, $Rn2$ of the respective temperature measurement resistance layers at the point of time at which the energization of the heater layer by an electric current flow is stopped, and calculates the temperature difference $\Delta Tmp12$ ($=Tn1-Tn2$) between the temperature measurement resistance layers at the point of time of stopping the current flow. The temperature difference between the temperature measurement resistance layers depends on the heat transmission characteristics with urea water capable of serving as a medium for heat transmission, and these heat transmission characteristics depend on the concentration of urea. For this reason, the calculated temperature difference $\Delta Tmp12$ can be converted into the concentration $Dn$. Also, on the basis of the calculated temperature difference $\Delta Tmp12$, one can determine whether or not the storage tank 41 is empty.

Here, in the present embodiment, the first sensor element 7411 is configured so that the first temperature measurement resistance layer may be in contact with urea water via the fin plate 7414. However, it may be configured in such a manner that a measurement chamber for introducing the urea water in the storage tank 41 is formed in the sensor element section 741, and the first temperature measurement resistance layer is heated by the heater via the urea water in this measurement chamber. In this case, the first temperature measurement resistance layer and the urea water will be in direct contact with one another.

Next, the configuration of the SCR-C/U 61 will be described in detail.

Figure 4:
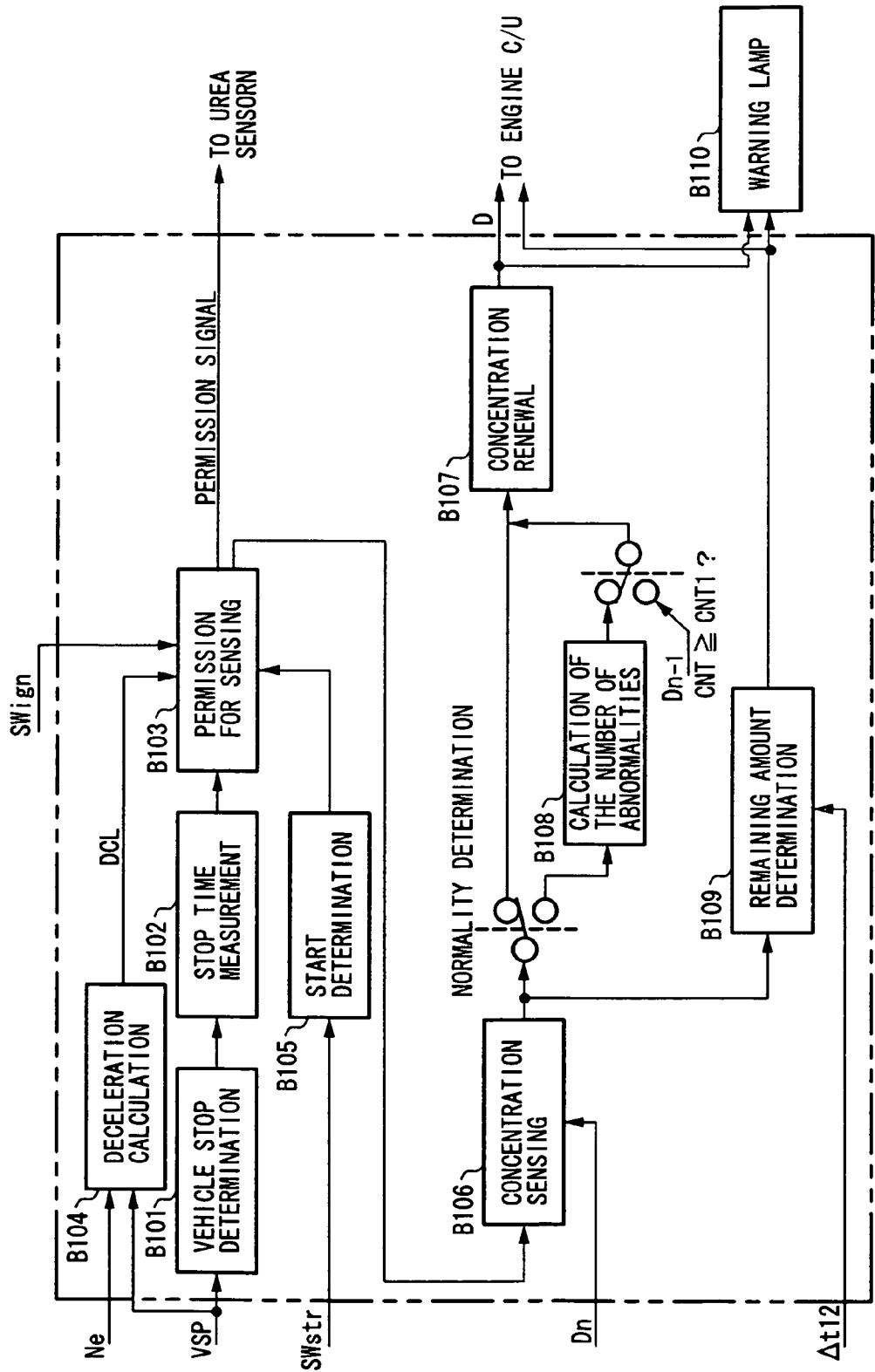
FIG. 4 Block diagram illustrating a general configuration of SCR-C/U is provided.

FIG. 4 shows a configuration of the SCR-C/U 61 by function blocks.

A vehicle stoppage determining section B101 receives input of a vehicle speed VSP from the engine C/U 51, and determines whether or not the vehicle has stopped on the basis of the input vehicle speed VSP.

A stoppage time measuring section B102 receives the result of determination by the vehicle stoppage determining section B101, and measures the lapse of time TIM that has elapsed after the stoppage of the vehicle.

A sensing permitting section B103 receives from a later-described deceleration calculating section B104 an input of the deceleration DCL of the vehicle before the stoppage, and sets a predetermined stationary time TIM1 in accordance with the input deceleration DCL. This stationary time TIM1 is set to be a period of time that is needed until the shaking of the urea water stored in the storage tank 41 ceases and the urea water comes to a standstill after the vehicle stops. The lapse of time TIM and the set stationary time TIM1 are compared, and a prohibition determination is issued until the lapse of time TIM reaches the stationary time TIM1, and a permission determination is issued when the lapse of time TIM reaches the stationary time TIM1. Also, the sensing permitting section B103 receives the result of determination by the later-described start determining section B105, and issues a permission determination at the start of the engine 1. This is because, at the time of the start of the engine 1, it can be determined that a considerable period of time has elapsed after the previous stoppage of the vehicle, so that there is a highly probability that the urea water is in a stationary state. The result of determination is output to the urea sensor 74. In the urea sensor 74, by receiving the permission determination of the sensing permitting section B103, the circuit section 742 operates to detect the concentration Dn.

On the basis of the vehicle speed VSP that is input from the engine C/U 51, the deceleration calculating section B104 calculates the deceleration DCL of the vehicle before the stoppage. Specifically, when it is detected that the vehicle has come into a deceleration state by the engine rotating number Ne, the deceleration calculating section B104 calculates the amount of change of the vehicle speed VSP per unit period of time, and sets the calculated amount of change as a deceleration DCL.

The start determining section B105 receives input of a start switch signal SWstr from the engine C/U 51 and determines whether or not it is the time of the start of the engine 1 by the input signal SWstr.

The concentration sensing section B106 reads the concentration Dn that has been detected by the urea sensor 74. As described before, the concentration Dn is detected by energizing the heater layer, sensing the resistance value Rn1 of the heated first temperature measurement resistance layer and the resistance value Rn2 of the second temperature measurement resistance layer that is not directly heated, and sensing the temperature difference $\Delta Tmp12$ between the temperature measurement resistance layers in accordance with the detected resistance values Rn1, Rn2. The concentration Dn is detected by the urea sensor 74 only when a permission determination is issued by the sensing permitting section B103.

The concentration renewing section B107 reads the concentration Dn from the concentration sensing section B106, and renews the memorized concentration (hereinafter, referred to as "concentration memorization value") D with the read concentration Dn. First, when the read concentration Dn is within a predetermined range indicating normality, the concentration renewing section B107 renews the concentration memorization value D with that concentration Dn (D=Dn). And even when the read concentration Dn is out of this predetermined range, the concentration renewing section B107 renews the concentration memorization value D with that concentration Dn; however, in this case, the renewal is made after determining that the concentration Dn that has been detected as being out of the predetermined range is a correct one, in the following manner.

The abnormality number of times calculating section B108 increments the count value CNT by one each time a concentration Dn that is out of the predetermined range is detected. On the other hand, a normal concentration Dn that is within the predetermined range is detected, the abnormality number calculating section B108 resets the count value CNT to zero. Then, to the concentration renewing section B107, the abnormality number calculating section B108 outputs the currently memorized concentration Dn−1 when the count value CNT is smaller than a predetermined value CNT1, and outputs this newly detected concentration Dn assuming that the newly detected concentration Dn is a correct one when the count value CNT has reached the value CNT1. The concentration memorization value D and the count value CNT are retained even when the ignition switch is turned off.

The concentration memorization value D is output from the concentration renewing section B107 to the engine C/U 51, so as to perform control for restraining the release of NOx to the minimum by collaboration of the engine 1 and the exhaust gas purifying apparatus. Also, when the concentration memorization value D is excessively low, a warning lamp B110 disposed on the control panel of a driver's cabin is operated, so as to inform the driver that an appropriate NOx purging function cannot be expected.

The remaining amount determining section B109 determines the remaining amount of urea water by focusing an attention on the difference between the heat transmission characteristics when urea water is used as a medium (including those having a concentration D of zero) and the heat transmission characteristics when air is used as a heat transmission medium at the time the storage tank 41 becomes empty. Namely, when an excessively large temperature difference $\Delta Tmp12$ is detected by the urea sensor 74, the remaining amount determining section B109 determines that the storage tank 41 is empty, outputs a signal indicating this to the engine C/U 51 and activates the warning lamp B110.

The warning lamp B110 is disposed on the control panel of the cabin.

Next, the operation of the SCR-C/U 61 will be described by way of flowcharts.

Figure 5:
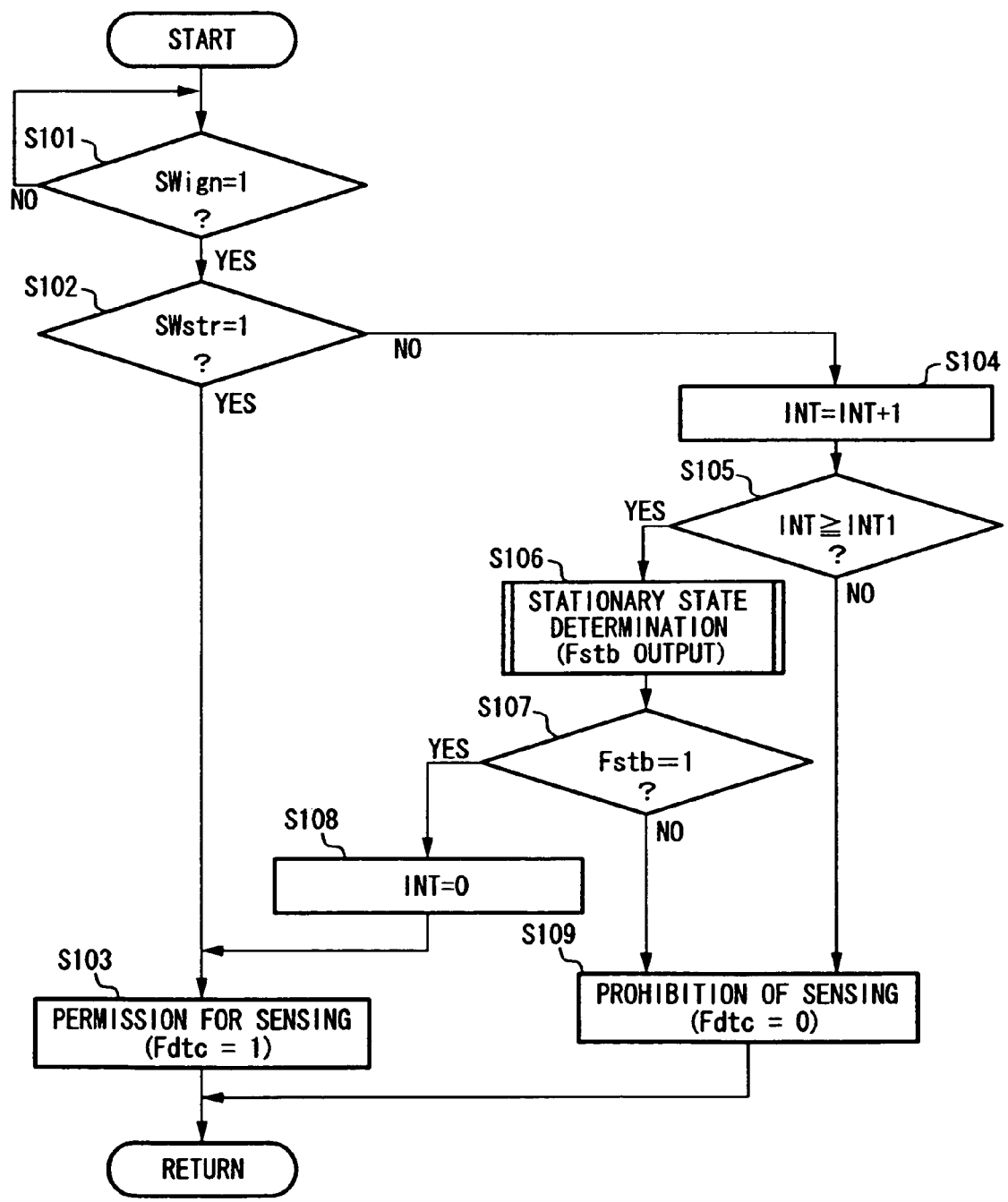
FIG. 5 Flowchart of a sensing permission routine is illustrated.
Figure 6:
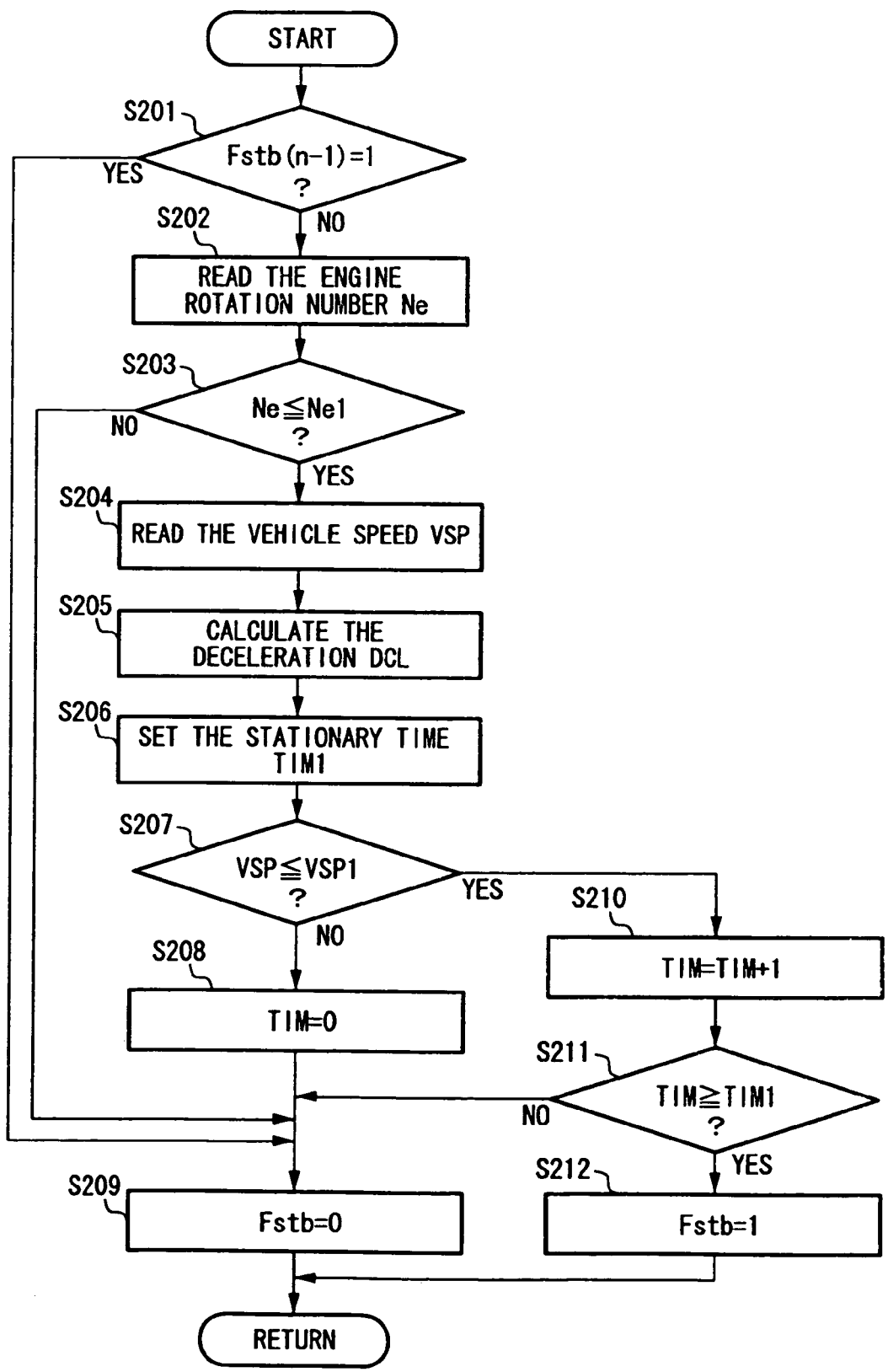
FIG. 6 Subroutine of a stillness determination process in the sensing permission routine is illustrated.

FIGS. 5 and 6 are flowcharts illustrating a sensing permission routine. This routine is started when the ignition switch is turned on, and is repeated each time a predetermined period of time elapses. This routine permits or prohibits the sensing of the concentration Dn.

In S101, the ignition switch signal SWign is read, and whether or not the signal SWign is 1 is determined. When it is 1, the flow proceeds to S102 assuming that the ignition switch is on.

In S102, the start switch signal SWstr is read, and whether or not the signal SWstr is 1 is determined. When it is 1, the flow proceeds to S103 for issuing a permission determination, assuming that the start switch is on and it is the time of the start of the engine 1. When it is not 1, the flow proceeds to S104.

In S103, the permission determination flag Fdtc is set to be 1, and a permission determination is issued.

In S104, the sensing interval INT is incremented by 1 (INT=INT+1).

In S105, whether or not the sensing interval INT after the increment has reached a predetermine value INT1 is determined. When it has reached the value INT1, the flow proceeds to S106 assuming that a sensing interval necessary for sensing the concentration Dn is ensured. When it has not reached the value INT1 yet, the flow proceeds to S109 to issue a prohibition determination assuming that a necessary sensing interval has not been ensured.

In S106, the determination of whether or not the urea water stored in the storage tank 41 is in a stationary state (hereinafter, referred to as "stillness determination") is carried out, and a stillness determination flag Fstb is set in response to the result of determination. The contents of the stillness determination will be described later in detail with reference to FIG. 6.

In S107, whether or not the stillness determination flag Fstb is 1 is determined. The stillness determination flag Fstb is set to be 1 when the urea water is determined to be in a stationary state by the stillness determination (namely, at the "stationary time"), and is set to be 0 in other cases (namely, at the "swinging time"). When it is 1, the flow proceeds to S103 after performing the process of the next S108. When it is not 1, the flow proceeds to S109.

In S108, the sensing interval INT is set to be 0.

In S109, the permission determination flag Fdtc is set to be 0, and a prohibition determination is issued.

In the flowchart shown in FIG. 6, in S201, whether or not the stillness determination flag Fstb(n−1) that was read when this routine was executed at the previous time is 1 is determined. When it is 1, the flow proceeds to S209, and the stillness determination flag Fstb is set to be 0. On the other hand, when it is not 1, the flow proceeds to S202.

In S202, the engine rotating number Ne is read.

In S203, whether the read engine rotating number Ne does not exceed a predetermine value Ne1 is determined. The value Ne1 corresponds to the upper limit value of a rotating number region indicating a deceleration state. In the present embodiment, the value Ne1 is set to be an idling determination rotating number corresponding to a load that separates the idling region and the region where the load is present.

In S204, the vehicle speed VSP is read.

In S205, the deceleration DCL is calculated as an amount of change in the vehicle speed VSP per unit period of time, on the basis of the read vehicle speed VSP.

In S206, setting of the stationary time TIM1 is executed. Here, the stationary time TIM1 is set to be a length corresponding to the deceleration DCL. For example, the largest one among the decelerations DCL that have been calculated until the vehicle stops after the vehicle enters a deceleration state is specified. According as this maximum deceleration DCLmax is larger, the stationary time TIM1 is extended assuming that the shaking of the urea water at the time of vehicle's stoppage is larger.

In S207, whether or not the vehicle speed VSP is equal to or less than a predetermined value VSP1 is determined. When it is equal to or less than the value VSP1, the flow proceeds to S210. When it is larger than the value VSP1, the flow proceeds to S208. The predetermined value VSP1 is not limited to 0, and can be set to have a magnitude as the maximum value of the vehicle speed by which the vehicle can be determined to be substantially stopped. This is because the shaking of the urea water in the storage tank 41 is weakened and the transition to the stillness state proceeds when the vehicle speed is low to some extent and it can be ensured that a large amount of deceleration is not applied even if the vehicle is not completely stopped.

In S208, the lapse time TIM is set to be 0.

In S209, the stillness determination flag Fstb is set to be 0.

In S210, the lapse time TIM is incremented by 1.

In S211, whether or not the lapse time TIM after the increment has reached the stationary time TIM1 is determined. When it has reached the stationary time TIM1, the flow proceeds to S212. When it has not reached, the flow proceeds to S209.

In S212, the stillness determination flag Fstb is set to be 1, and a determination that the urea water has come to a standstill is issued.

Figure 7:
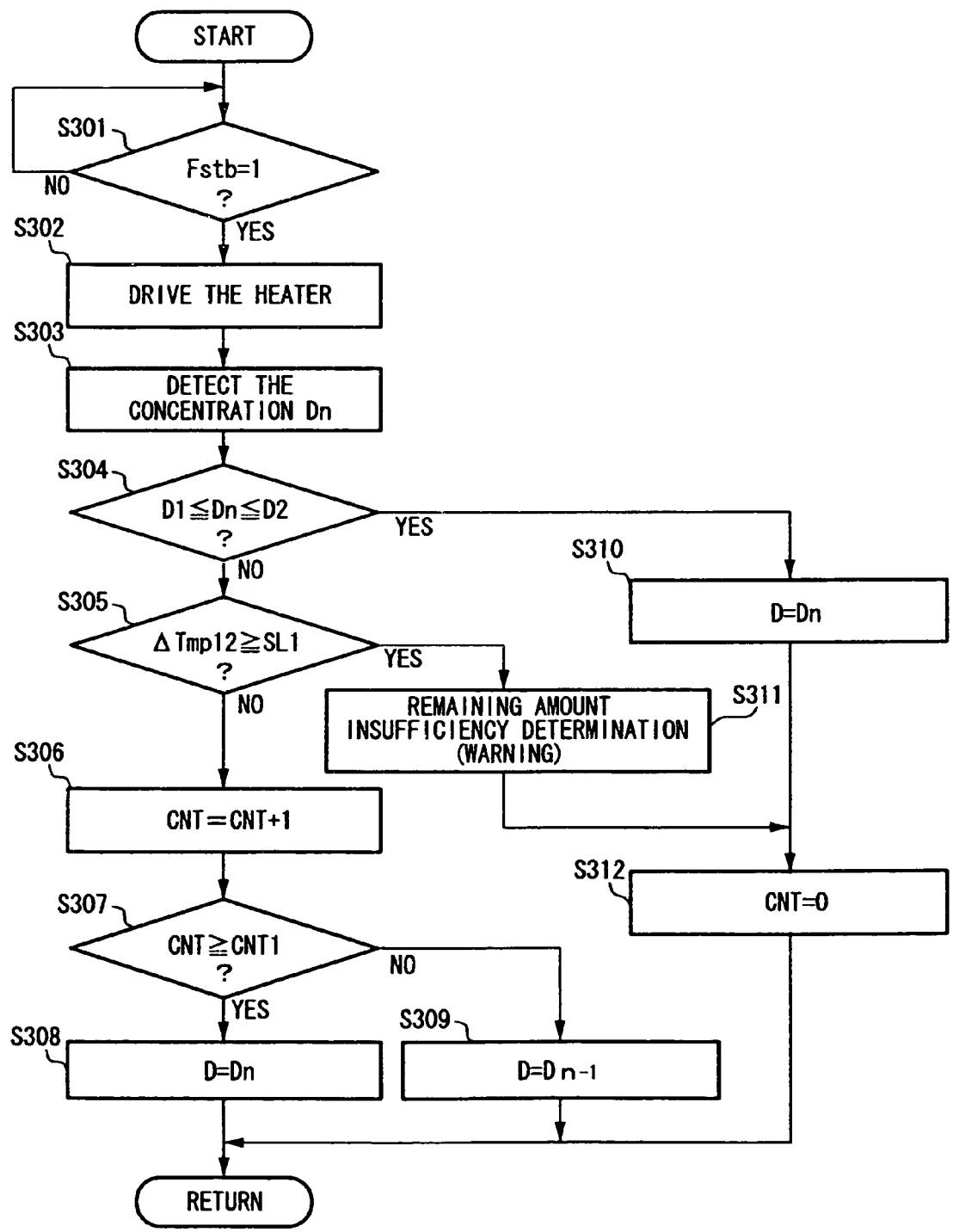
FIG. 7 Flowchart of a concentration sensing routine is illustrated.

FIG. 7 is a flowchart of a concentration sensing routine. This routine is executed when the stillness determination flag Fstb is set to be 1 by the SCR-C/U 61 and the circuit section 742. S302 and S303 are the processes carried out by the circuit section 742. By this routine, the concentration Dn is detected, and the concentration memorization value D is renewed.

In S301, the stillness determination flag Fstb is read in, and whether or not the read flag Fstb is 1 is determined. Only when it is 1, the flow proceeds to S302.

In S302, for sensing the concentration Dn, the heater layer of the urea sensor 74 is energized, so as to heat the first temperature measurement resistance layer directly and to heat the second temperature measurement resistance layer indirectly using the urea water as a medium.

In S303, the concentration Dn is detected. The sensing of the concentration Dn is carried out by sensing the resistance values Rn1, Rn2 of the respective heated temperature measurement resistance layers, calculating the temperature difference $\Delta Tmp12$ between the temperature measurement resistors according to the difference of the detected resistance values Rn1, Rn2, and converting the calculated temperature difference $\Delta Tmp12$ into the concentration Dn.

In S304, whether or not the detected concentration Dn is within a predetermined range having a first value D1 as a lower limit and having a second value D2 larger than this first value as an upper limit is determined. When it is within this predetermined range, the flow proceeds to S310. When it is not within this predetermined range, the flow proceeds to S305.

In S305, the temperature difference $\Delta Tmp12$ is read in, and whether or not the read temperature difference $\Delta Tmp12$ is equal to or lager than a predetermined value SL1 is determined. When it is equal to or larger than the value SL1, the flow proceeds to S311. When it is less than the value SL1, the flow proceeds to S306. The value SL1 is set to be an intermediate value between the temperature difference $\Delta Tmp12$ obtained in a state in which the urea sensor 74 is in the urea water and the temperature difference $\Delta Tmp12$ obtained in a state in which the urea sensor 74 is in the air.

In S306, the count value CNT is incremented by 1.

In S307, whether or not the count value CNT after the increment has reached a predetermined value CNT1 is determined. When it has reached the value CNT1, the flow proceeds to S308, whereas when it has not reached the value CNT1, the flow proceeds to S309.

In S308, it is determined that concentrations Dn that are out of the predetermined range defined by the first and second values D1, D2 are continually detected for a predetermined number CNT1 of times and that the newly detected concentration Dn has a sufficient reliability though being out of the predetermined range, so that the concentration memorization value D is renewed with the newly detected concentration Dn.

In S309, it is determined that the newly detected concentration Dn that is out of the predetermined range does not have a sufficient reliability and that there is a possibility of incidental erroneous sensing, so that the currently memorized concentration D (=Dn−1) is maintained successively as the concentration memorization value D.

In S310, it is assumed that the detected concentration Dn is within the predetermined range and hence is a normal one, so that the concentration memorization value D is renewed with the concentration Dn.

In S311, the determination that the storage tank 41 is empty is issued, and a signal indicating this determination result is delivered as an output to the engine C/U 51, and a warning lamp is activated.

In S312, the count value CNT is set to be 0.

Figure 8:
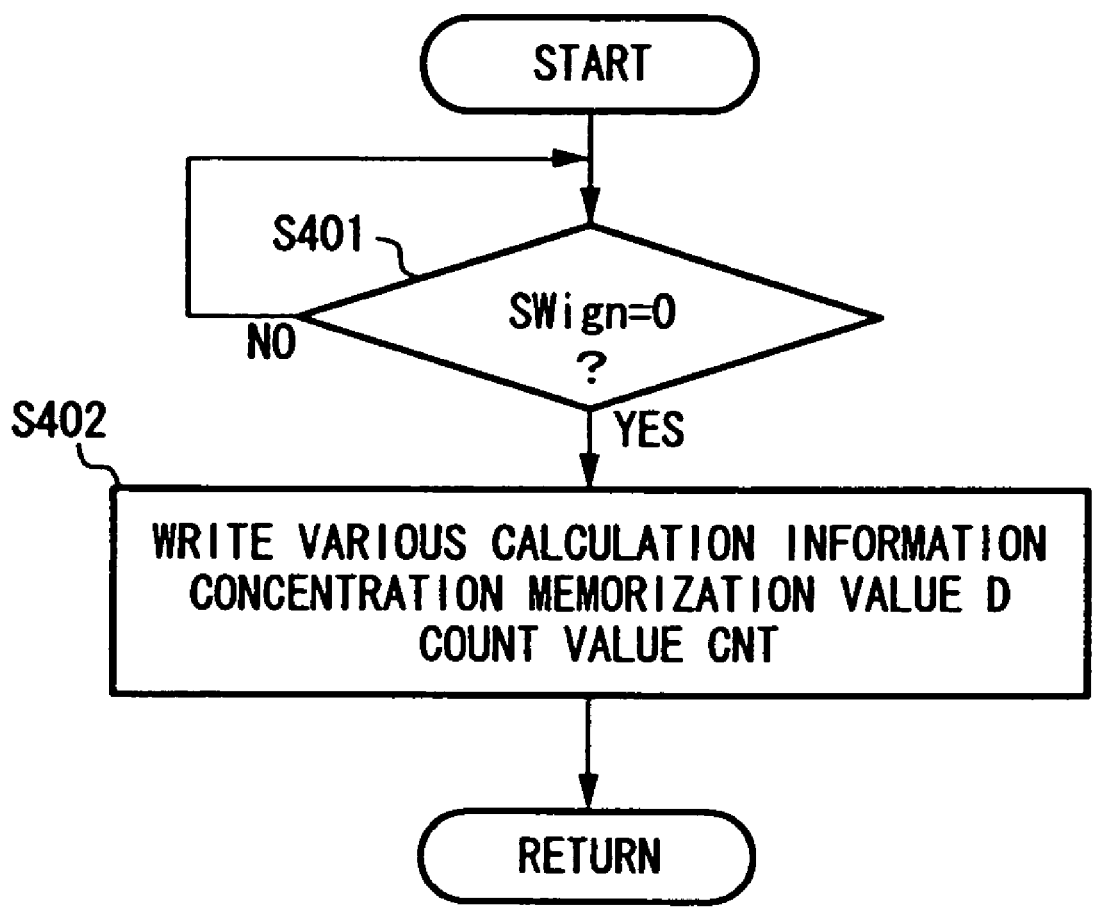
FIG. 8 Flowchart of a stop control routine is illustrated.

FIG. 8 is a flowchart of a stoppage control routine. This routine is executed when the ignition switch is turned off.

In S401, the ignition switch signal SWign is read in, and whether or not the signal SWign is 0 is determined. When it is 0, it is assumed that the ignition switch has been turned off, and the flow proceeds to S402.

In S402, various information of operation is written into a backup memory. The operation information written into this memory is retained even after the ignition switch is turned off and the power supply is turned down. In the next operation, the operation information is read by the concentration sensing routine (S306) and by the later-described urea water injecting control routine (S501). In the present embodiment, the concentration memorization value D and the count value CNT are written as the operation information.

Figure 9:
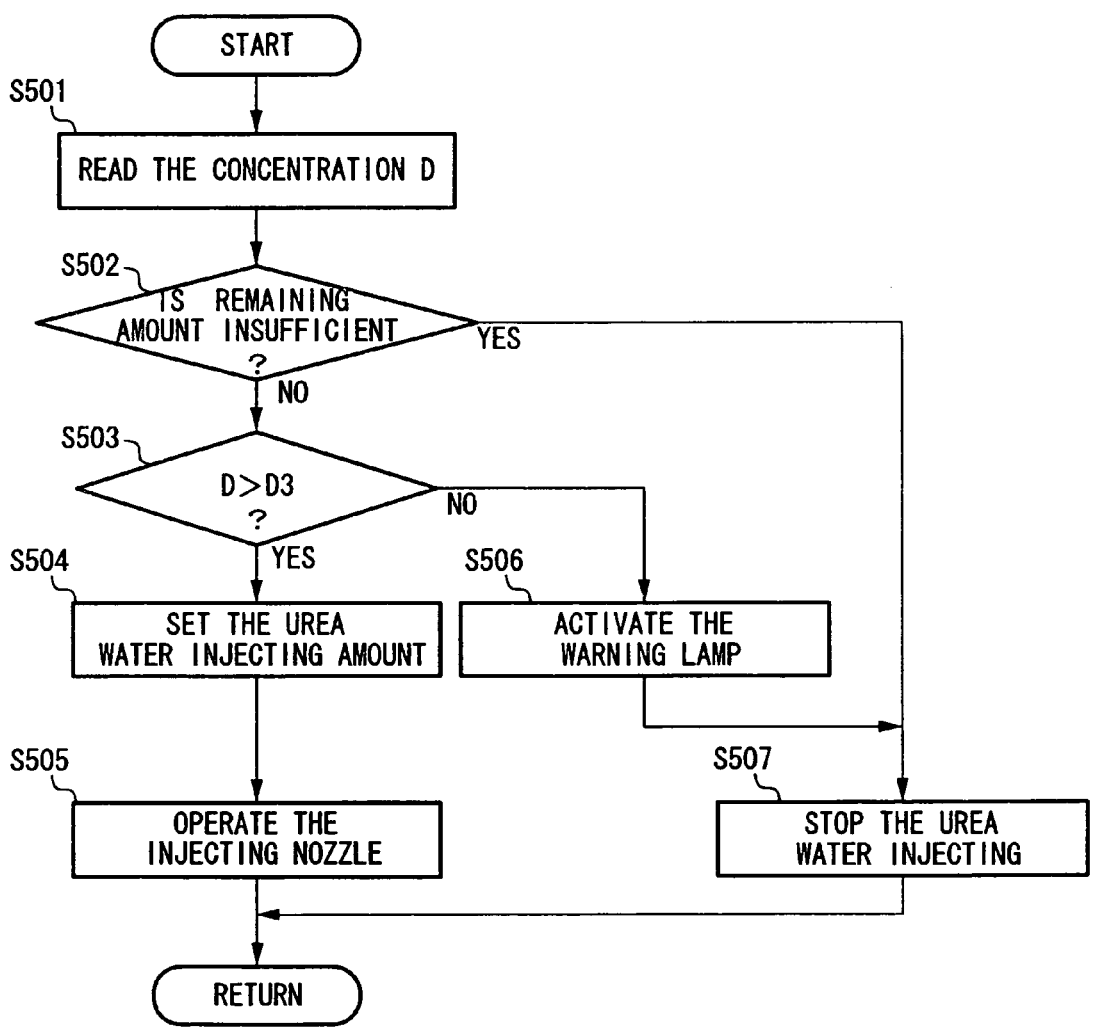
FIG. 9 Flowchart of urea water injecting control routine is illustrated.

Next, one example of urea water injecting control using the concentration memorization value D will be described by way of the flowchart shown in FIG. 9. This routine is executed each time a predetermined period of time elapses.

In S501, the concentration memorization value D is read in.

In S502, the result of the remaining amount determination is read in. When the storage tank 41 is empty, the flow proceeds to S507, whereas when it is not empty, the flow proceeds to S503.

In S503, whether or not the concentration memorization value D is larger than a predetermined value D3 is determined. When it is larger than the value D3, the flow proceeds to S504, whereas when it is not larger than the value D3, the flow proceeds to S506. The predetermined value D3 is set to be a value smaller than the first value D1, as a concentration that can be detected when the urea water is water or in a dilute state near to water or in the case where a different kind of an aqueous solution other than water or urea water is stored in the storage tank 41. Here, the value D3 may be set to be a value equal to the first value D1.

In S504, an amount of injection of the urea water is set. The setting of the amount of injection of the urea water is carried out by calculating an amount of injection of the fuel and a basic amount of injection according to the output of the NOx sensor 73, and by correcting the calculated basic amount of injection with the concentration memorization value D. When the concentration memorization value D is large and the content of urea per unit amount of injection is high, a correction is made by reducing the basic amount of injection. On the other hand, when the concentration memorization value D is small and the content of urea per unit amount of injection is low, a correction is made by increasing the basic amount of injection.

In S505, an operation signal in compliance with the set amount of injection of the urea water is delivered as an operation output to the injecting nozzle 43.

In S506, the warning lamp is operated so as to inform the vehicle driver of an abnormality state of the urea water.

In S507, the injecting of the urea water is stopped. This is because, not only when the tank 41 is empty but also when the concentration of urea is extremely low or when water or the like is stored in the tank 41 instead of the urea water, it is not possible to spout a necessary amount of urea water that is needed for addition of ammonia.

Regarding the present embodiment, the urea water supply pipe 42, the injecting nozzle 43, the feed pump 44, and the air supply pipe 48 constitute the "addition apparatus" of the reducing agent; the urea sensor 74 constitutes the "concentration sensor"; and the SCR-C/U 61 constitutes the "controller". Also, the deceleration calculating section B104 of the SCR-C/U 61 constitutes the "deceleration sensor".

Also, regarding the present embodiment, the urea water supply pipe 42, the injecting nozzle 43, the feed pump 44, and the air supply pipe 48 constitute the "addition means"; the storage tank 41 constitutes the "storage means"; the urea sensor 74 constitutes the "concentration sensing means"; and the SCR-C/U 61 constitutes the "command generating means", the "state determining means", and the "sensing permitting means". Among the functions of the SCR-C/U 61, the process of S504 shown in FIG. 9 corresponds to a function as the "command generating means"; the processes of S207, 210, and 211 shown in FIG. 6 correspond to a function as the "state determining means"; and the processes of S209 and 212 shown in FIG. 6 correspond to the "sensing permitting means".

According to the present embodiment, effects such as the following can be obtained.

Firstly, in sensing the concentration with the temperature-sensitive type urea sensor 74, the concentration is detected only in the case where the vehicle is stopped and also a predetermined stationary time TIM1 has elapsed after the stoppage. For this reason, the concentration is detected only when there is a high probability that the urea water is stationary in the storage tank 41, and the concentration is not detected in other cases. Therefore, the fluctuation of heat transmission characteristics caused by undulations of the road surface or change in the running environment is eliminated, and a correct concentration can be detected.

Secondly, the deceleration DCL of the vehicle before the stoppage is detected, and the stationary time TIM1 is changed in accordance with the detected deceleration DCL. For this reason, it is possible to detect the concentration when the urea water becomes sufficiently stable after the stoppage, whereby the precision of sensing can be improved.

Thirdly, when the detected concentration Dn is within a predetermined range indicating normality, the concentration memorization value D is renewed with the concentration Dn, whereas when the detected concentration Dn is out of this predetermined range, the concentration memorization value D is renewed with the concentration Dn on condition that such abnormal concentration has been detected continually for a predetermined number CNT1 of times or more. For this reason, renewal of the concentration memorization value D with the erroneous concentration Dn that has been detected only incidentally is prevented, and the reliability of the concentration memorization value D can be enhanced.

In the fourth, the amount of injecting of urea water is controlled on the basis of the concentration memorization value D, so that a necessary amount of urea water needed for letting the reduction of NOx proceed well can be injected with certainty.

Here, in the above, ammonia is generated by hydrolysis of urea; however, catalyst for this hydrolysis is not specifically shown. In order to enhance the efficiency of hydrolysis, a hydrolysis catalytic converter may be disposed in the upstream of the NOx purging catalyst 33.

Also, in the above, in the case where a concentration Dn that is out of the predetermined range has been detected, the determination that a predetermined number of concentrations Dn that have been continually detected up to the present are such abnormal concentrations is adopted as the condition for renewal of the concentration memorization value D. As a condition for renewal, instead of this determination, a predetermined number of concentrations Dn that have been continually detected up to the present may be summed up, and the determination that a summed value or an average value thereof is not within a predetermined range may be adopted, so as to determine the reliability of the abnormal concentration.

Also, in the above, the concentration memorization value D and the count value CNT are adopted as the calculation information that is written into the backup memory. The result of the remaining amount determination carried out in S305 or the abnormality determination carried out in S503 may be memorized, for example, as an identification flag, and this identification flag may be written together with the concentration memorization value D and others so that each determination result may be retained even while the engine is stopped.

The present invention can also be applied to diesel engines and gasoline engines other than those of direct injection type.

In the above, the present invention has been described by way of several preferable embodiments; however, the scope of the present invention is in no way limited to this description, and is determined in accordance with applied rules on the basis of the description of the scope of the claims.

We claim:

1. An exhaust gas purifying apparatus for an engine, comprising:
   an addition apparatus that adds a reducing agent of NOx to an exhaust gas from the engine;
   a storage tank that stores the reducing agent of NOx that is added to the exhaust gas by the addition apparatus or a precursor thereof in a state of an aqueous solution;
   a concentration sensor that detects a concentration of the reducing agent or the precursor contained in the aqueous solution of the reducing agent or the precursor that is stored in the storage tank; and
   a controller that generates an operation command to a predetermined object for being controlled related to purifying of the exhaust gas on the basis of the detected concentration which is the concentration of the reducing agent or the precursor detected by the concentration sensor, wherein
   the controller determines whether or not the aqueous solution of the reducing agent or the precursor in the storage tank is in a stationary state and, at a stationary time when it is determined to be in a stationary state, permits sensing of the concentration by the concentration sensor, while at a shaking time other than the stationary time, prohibits the sensing of the concentration by the concentration sensor, and wherein
   the concentration sensor detects the concentration of the reducing agent or the precursor only at the stationary time.

2. The exhaust gas purifying apparatus for the engine according to claim 1, wherein the controller determines whether or not a vehicle is stopped, and measures a period of time that has elapsed after stoppage, and determines that the aqueous solution of the reducing agent or the precursor is in a stationary state when it is determined that the vehicle is stopped and the measured period of time that has elapsed is a predetermined period of time or longer than this.

3. The exhaust gas purifying apparatus for the engine according to claim 2, wherein the controller memorizes the detected concentration as a concentration memorization value, and renews the concentration memorization value with the detected concentration only when the detected concentration is within a predetermined range.

4. The exhaust gas purifying apparatus for the engine according to claim 2, wherein the controller memorizes the detected concentration as a concentration memorization value and, when the detected concentration is within a predetermined range, renews the concentration memorization value with the detected concentration, while when the detected concentration is out of the predetermined range, renews the concentration memorization value with the detected concentration on such a condition that, among a predetermined number of detected concentrations obtained up till now, those of a predetermined ratio of the predetermined number are out of the range.

5. The exhaust gas purifying apparatus of the engine according to claim 4, wherein the predetermined number of detected concentrations include detected concentrations obtained before the stoppage of the engine of the previous time.

6. The exhaust gas purifying apparatus for the engine according to claim 4, wherein the controller generates a warning signal that informs a driver of an abnormality of the concentration of the reducing agent or the precursor in the case of renewing the concentration memorization value with the detected concentration that is out of the predetermined range.

7. The exhaust gas purifying apparatus for the engine according to claim 2, further comprising a deceleration sensor that detects a deceleration of the vehicle before the stoppage, wherein the controller renews the predetermined period of time in accordance with the deceleration of the vehicle that is detected by the deceleration sensor.

8. The exhaust gas purifying apparatus for the engine according to claim 7, wherein the controller prolongs the predetermined period of time according as the detected deceleration of the vehicle is larger.

9. The exhaust gas purifying apparatus for the engine according to claim 1, wherein the controller determines that the aqueous solution of the reducing agent or the precursor is in a stationary state at the time of the start of the engine.

10. The exhaust gas purifying apparatus of the engine according to claim 1, wherein the controller controls an amount of addition of the reducing agent by the addition apparatus on the basis of the detected concentration.

11. The exhaust gas purifying apparatus for the engine according to claim 1, wherein the concentration sensor comprises a sensor element section disposed in the storage tank and a circuit section connected to the sensor element section,
    wherein the sensor element section is configured to include a heater and a temperature-sensitive body having a property of changing an electrical characteristic value depending on a temperature, said temperature-sensitive body being directly or indirectly in contact with the aqueous solution of the reducing agent or the precursor in the storage tank, and being heated by this heater; and
    wherein the circuit section drives the heater, detects the electrical characteristic value of the heated temperature-sensitive body, and detects the concentration of the reducing agent or the precursor on the basis of the detected electrical characteristic value.

12. The exhaust gas purifying apparatus for the engine according to claim 11, wherein the controller generates a determination signal indicating whether or not a predetermined amount or more of the aqueous solution of the reducing agent or the precursor is left in the storage tank on the basis of the electrical characteristic value detected by the circuit section.

13. The exhaust gas purifying apparatus for the engine according to claim 1, wherein the reducing agent of NOx is ammonia.

14. The exhaust gas purifying apparatus for the engine according to claim 13, wherein the storage tank stores urea water serving as the aqueous solution of the precursor.

15. An exhaust gas purifying apparatus for an engine, comprising:
    addition means for adding a reducing agent of NOx to an exhaust gas of the engine;
    storage means for storing the reducing agent of NOx that is added to the exhaust gas by the addition means or a precursor thereof in a state of an aqueous solution;
    concentration sensing means for sensing a concentration of the reducing agent or the precursor contained in the aqueous solution of the reducing agent or the precursor that is stored in the storage means;

command generating means for generating an operation command to a predetermined object for being controlled related to purifying of the exhaust gas on the basis of the detected concentration which is the concentration of the reducing agent or the precursor detected by the concentration sensing means;

state determining means for determining whether or not the aqueous solution of the reducing agent or the precursor is in a stationary state in the storage means; and sensing permission means for permitting sensing of the concentration by the concentration sensing means at a stationary time when the aqueous solution of the reducing agent or the precursor is determined to be in the stationary state by the state determining means, while prohibiting the sensing of the concentration by the concentration sensing means at a shaking time other than the stationary time, wherein the concentration sensing means detects the concentration of the reducing agent or the precursor only at the stationary time.

16. The exhaust gas purifying apparatus for the engine according to claim 15, wherein the command generating means generates an operation command for increasing or decreasing an amount of addition of the reducing agent to the addition means on the basis of the detected concentration.

17. A method for purifying exhaust gas containing therein NOx by providing a storage tank that stores a reducing agent of NOx or a precursor thereof in a state of an aqueous solution and supplying the aqueous solution of the reducing agent or the precursor stored in the storage tank to the exhaust gas from the engine, the method comprising:

arranging a concentration sensor that detects a concentration of the reducing agent or the precursor contained in the aqueous solution of the reducing agent or the precursor stored in the storage tank, determining whether or not the aqueous solution of the reducing agent or the precursor is in a stationary state in the storage tank, and operating a predetermined object for being controlled related to purifying of the exhaust gas on the basis of the detected concentration which is the concentration of the reducing agent or the precursor detected by the concentration sensor at the stationary time when it is determined to be in a stationary state, while prohibiting the operation of the object for being controlled according to the detected concentration at a shaking time other than the stationary time, and operating the object for being controlled on the basis of the detected concentration obtained at the stationary time before the shaking time.

* * * * *

UNITED STATES PATENT AND TRADEMARK OFFICE
CERTIFICATE OF CORRECTION

PATENT NO.         : 7,467,512 B2
APPLICATION NO.    : 10/577222
DATED              : December 23, 2008
INVENTOR(S)        : Mitsuhiro Nishina et al.

It is certified that error appears in the above-identified patent and that said Letters Patent is hereby corrected as shown below:

Column 4, Line 63: Replace "$NO+NO_2+2NH_3 \rightarrow 2N_2+3H_2O$" with --$NO+NO_2+2NH_3 \rightarrow 2N_2+3H_2O$--.

Column 4, Line 65: Replace "$4NH_3+3O2 \rightarrow 2N_2+6H_2O$" with --$4NH_3+3O_2 \rightarrow 2N_2+6H_2O$--.

Signed and Sealed this

Seventeenth Day of March, 2009

JOHN DOLL
*Acting Director of the United States Patent and Trademark Office*